US011791650B2

United States Patent
Perry et al.

(10) Patent No.: US 11,791,650 B2
(45) Date of Patent: Oct. 17, 2023

(54) MULTIPLE OUTPUT CHARGING SYSTEM AND CONTROLLER

(71) Applicant: Texas Instruments Incorporated, Dallas, TX (US)

(72) Inventors: John Mitchell Perry, McKinney, TX (US); Indumini Ranmuthu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 541 days.

(21) Appl. No.: 16/821,637

(22) Filed: Mar. 17, 2020

(65) Prior Publication Data

US 2020/0303939 A1    Sep. 24, 2020

Related U.S. Application Data

(60) Provisional application No. 62/820,171, filed on Mar. 18, 2019.

(51) Int. Cl.
*H02J 7/02* (2016.01)
*H02J 7/00* (2006.01)

(52) U.S. Cl.
CPC .......... *H02J 7/02* (2013.01); *H02J 7/007186* (2020.01); *H02J 2207/20* (2020.01); *H02J 2207/40* (2020.01)

(58) Field of Classification Search
CPC .... H02J 7/02; H02J 7/007186; H02J 2207/20; H02J 2207/40; H02J 7/00714;

(Continued)

(56) References Cited

U.S. PATENT DOCUMENTS 6,643,151 B1 * 11/2003 Nebrigic ............. H02M 3/1588
                                                        363/124
7,256,516 B2 *  8/2007 Buchanan .............. B60L 53/67
                                                         307/62

(Continued)

FOREIGN PATENT DOCUMENTS

| CA | 2773994 A1 * | 3/2011 | ............... H02J 3/00 |
| CN | 109476264 A * | 3/2019 | ............ B60K 37/00 |
| JP | 2016045858 A * | 4/2016 | ............... H02J 9/00 |

OTHER PUBLICATIONS

"TPS65988 Dual Port USB Type-C and USB PD Controller with Integrated Power Switches", Texas Instruments, TPS65988, SLVSDB5A—Jul. 2018—Revised Aug. 2018, 83 pgs.

(Continued)

*Primary Examiner* — M Baye Diao
(74) *Attorney, Agent, or Firm* — Ray A. King; Frank D. Cimino

(57) ABSTRACT

A multi-port charging system includes a controller having a power input terminal coupled to a DC power output of a converter, multiple power output terminals coupled to the power input terminal, and a communications input terminal. The system includes multiple charger ports, the respective charger ports having a charging power line coupled to a respective one of the power output terminals, and a communications line coupled to the communications input terminal. The controller is configured to control the state of the control output terminal to set a voltage of the DC power output according to a selected highest common compatible voltage of one or more sink devices coupled to one or more respective ones of the charger ports.

18 Claims, 4 Drawing Sheets

(58) Field of Classification Search
CPC .... H02J 7/007182; H02J 7/04; H02J 2310/22; H02J 7/00047; H02J 7/0013; H02J 7/00034
USPC ......................................................... 320/140
See application file for complete search history.

(56) References Cited

U.S. PATENT DOCUMENTS

| | | | |
|---|---|---|---|
| 9,350,185 B2 * | 5/2016 | Longdon | H02J 7/00 |
| 9,831,672 B2 * | 11/2017 | Luh | G06F 1/26 |
| 9,917,440 B2 * | 3/2018 | Luh | H02J 1/14 |
| 10,230,244 B2 * | 3/2019 | Zhang | H02J 7/0042 |
| 10,277,052 B2 * | 4/2019 | Li | H02J 7/0071 |
| 10,333,412 B2 * | 6/2019 | Ono | H02M 3/33576 |
| 2013/0057210 A1 * | 3/2013 | Nergaard | H02J 7/0042 |
| | | | 320/109 |
| 2015/0165917 A1 * | 6/2015 | Robers | H01M 10/441 |
| | | | 320/109 |

OTHER PUBLICATIONS

"LM53600/01-Q1, 0.65A/1A, 36V Synchronous, 2.1MHz, Automotive Step Down DC-DC Converter", Texas Instruments, LM53600-Q1, LM53601-Q1, SNAS660B—Jun. 2015—Revised Feb. 2016, 44 pgs.

"LM5175 42-V Wide VIN Synchronous 4-Switch Buck-Boost Controller", Texas Instruments, OPA2210, SB0S924B—Sep. 2018—Revised Mar. 2019, 32 pgs.

* cited by examiner

MULTIPLE OUTPUT CHARGING SYSTEM AND CONTROLLER

CROSS-REFERENCE TO RELATED APPLICATION

Under 35 U.S.C. § 119, this application claims priority to, and the benefit of, U.S. provisional patent application No. 62/820,171, entitled "Multiple Output Power Delivery Scheme Using Single Output DC/DC Converter Device" filed on Mar. 18, 2019, the entirety of which is hereby incorporated by reference.

BACKGROUND

Charging systems are useful in a variety of applications to provide convenient charging for personal devices, such as smart phones, tablets, laptop computers, etc. Due to the proliferation of battery-operated personal devices, it is desirable to provide charging systems able to charge multiple devices concurrently, for example, in automotive or home applications. Universal serial bus (USB) technology allows DC charging. USB devices are typically designed to operate at a default charging condition with 5 V and 0.5 A. Fast charging implementations, such as USB power delivery (USB-PD) allow power supplies (e.g., sources) and loads (e.g., sinks) to negotiate higher charging voltages and/or charging current levels, such as 3-21 V and 0-5 A. Multiple output or multi-port chargers provide charger ports and corresponding DC voltage supplies (e.g., AC to DC or DC to DC converters) that may adapt voltage and/or current of a given charger port to accommodate sink devices or loads that can operate at different voltages and/or currents, in order to facilitate fast charging.

However, such multi-port solutions for concurrently charging n sink devices require one converter per charger port, and each converter must have a sufficient power rating to provide desirable fast charging. This adds to charging system cost, particularly where fewer than n sink devices are typically connected at a given time and/or common charging conditions do not utilize the full power budget of the converter. In addition to cost considerations, certain applications (e.g., portable battery-operated USB chargers, automotive vehicle USB chargers, etc.) have power and size design limitations, where small low-power charging systems are needed. However, multi-port charging systems with n DC to DC converters often have a system power budget below the maximum power of the combined converters, where the total system power budget Ptot<Σ [DC to DC_(1)+DC to DC_(2)+DC to DC_(n)], resulting in poor power and system space utilization.

SUMMARY

A controller includes a power input terminal, an integer number N power output terminals coupled to the power input terminal, a communications input terminal, and a control output terminal having an integer number M states, where N is greater than 1 and M is greater than 1. The respective power output terminals are adapted to be coupled to respective charging power lines of N charger ports, and the communications input terminal is adapted to be coupled to communications lines of the respective charger ports. The power input terminal is adapted to be coupled to a power output of a converter, and the control output terminal adapted to be coupled to a control input of the converter.

In one example, the controller is an integrated circuit. In one example, the controller includes a logic circuit, such as a processor or a state machine, having a communications interface coupled to the communications input terminal, and a voltage select output coupled to the control output terminal. In one example, the controller includes a switch circuit having N switches coupled between the power input terminal and a respective one of the power output terminals, and the logic circuit includes N switch control outputs coupled to control terminals of respective ones of the switches. In one example, the logic circuit is configured to control the state of the control output terminal responsive to a highest common compatible voltage of one or more sink devices coupled to one or more respective ones of the power output terminals. In one implementation, the logic circuit is configured to select the highest common compatible voltage of the one or more sink devices responsive to sink device parameters received in communications signals of the communications input terminal, and a power budget of a converter coupled to the power input terminal.

In accordance with further aspects, a controller includes a power input terminal, N power output terminals coupled to the power input terminal, where N is an integer greater than 1, as well as a communications input terminal, a control output terminal, and a logic circuit. The control output terminal has M states, where M is an integer greater than 1. The logic circuit is configured to receive communications signals of the communications input terminal, where the communications signals have sink device parameters of one or more sink devices coupled to one or more respective ones of the power output terminals. The logic circuit is further configured to select a highest common compatible voltage of the sink device parameters according to a power budget of a converter coupled to the power input terminal. The logic circuit is also configured to control the state of the control output terminal according to the selected highest common compatible voltage of the sink device parameters to cause the converter to deliver the selected highest common compatible voltage at the power input terminal.

In one example, the logic circuit is configured to control the state of the control output terminal by generating a voltage select signal at the control output terminal, where a state of the generated voltage select signal represents the selected highest common compatible voltage of the sink device parameters. In one implementation, the logic circuit is configured to generate the voltage select signal as a digital signal having a selected one of M states.

In one example, the logic circuit includes a processor coupled to a memory, the memory configured to store the sink device parameters and the power budget. In one example, the logic circuit includes a state machine.

In one example, the logic circuit is configured to select an updated highest common compatible voltage of the sink device parameters according to the power budget responsive to connection and/or disconnection of one or more sink devices to or from one or more respective ones of the power output terminals.

In one example, the controller includes a switch circuit having N switches coupled between the power input terminal and a respective one of the power output terminals, and the logic circuit includes N switch control outputs coupled to control terminals of respective ones of the switches. In one implementation, the logic circuit is configured to generate switching control signals at the switch control outputs to selectively couple the power input terminal to selected ones of the power output terminals to which a sink device is connected.

In accordance with another aspect, a charging system includes a converter, a controller, and N charger ports, where N is an integer greater than 1. The converter has a power output, and a control input. The controller has a power input terminal, N power output terminals, a communications input terminal, and a control output terminal. The power input terminal is coupled to the power output of the converter, and the respective power output terminals are coupled to the power input terminal. The control output terminal is adapted to be coupled to a converter, and the control output terminal has M states, where M is an integer greater than 1. The respective charger ports have a charging power line coupled to a respective one of the power output terminals, and a communications line coupled to the communications input terminal. The controller is configured to control the state of the control output terminal to set a voltage of the converter power output according to a selected highest common compatible voltage of one or more sink devices coupled to one or more respective ones of the charger ports.

In one example, the controller is configured to receive communications signals of the communications input terminal, where the communications signals have sink device parameters of the sink device or devices. The controller is configured to select the highest common compatible voltage of the sink device parameters according to a power budget of the converter, and generate a voltage select signal at the control output terminal, where a state of the generated voltage select signal represents the selected highest common compatible voltage of the sink device parameters.

In one example, the charging system includes a switch circuit having N switches coupled between the power input terminal and a respective one of the power output terminals. In one implementation, the controller includes switch control outputs coupled to the control terminals of respective ones of the switches, and the controller is configured to generate switching control signals at the switch control outputs to selectively couple the power input terminal to selected ones of the power output terminals to which a sink device is connected.

DETAILED DESCRIPTION

Figure 1:
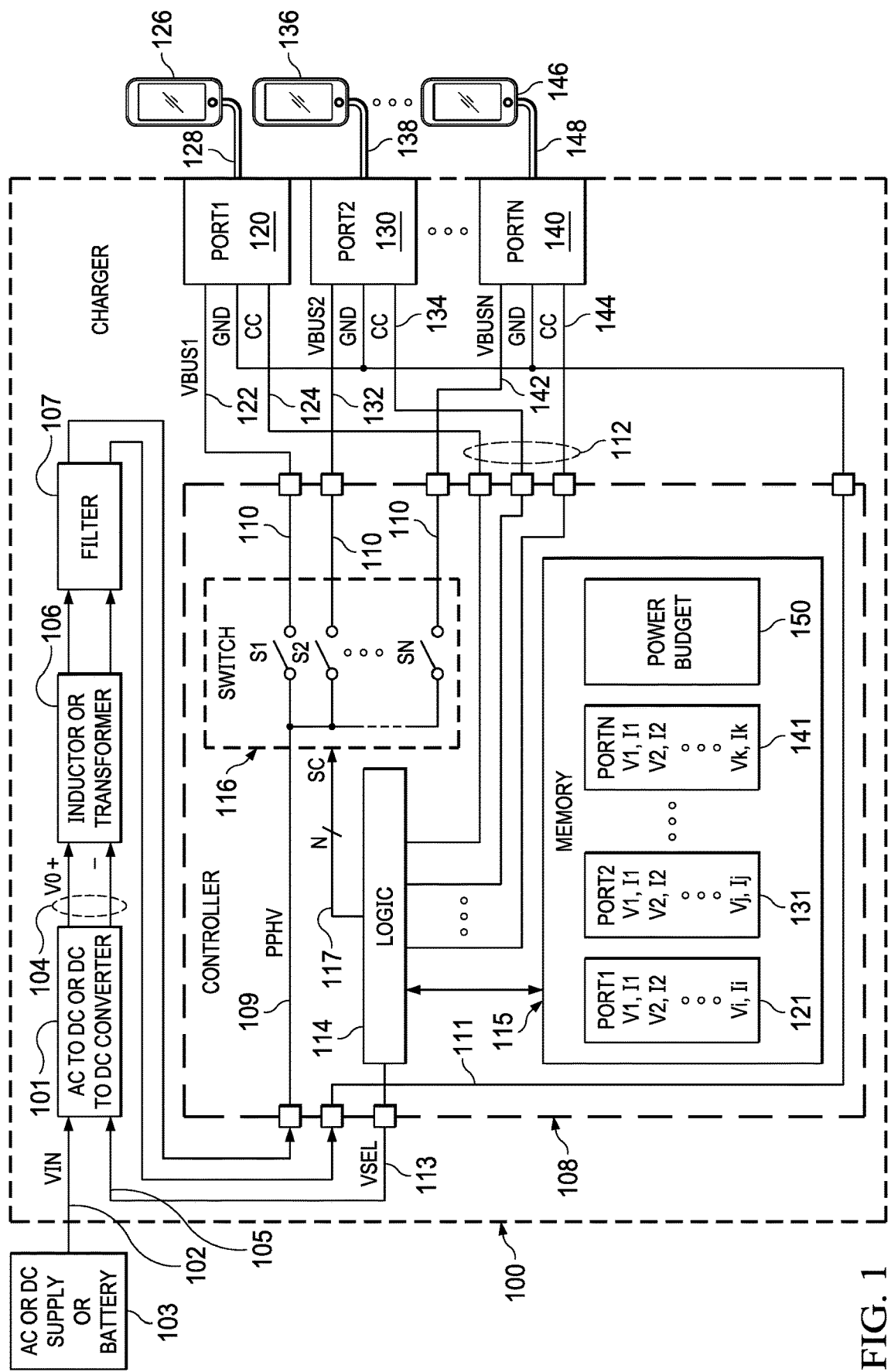
FIG. 1 is a schematic diagram of a multi-port charging system with a single adjustable converter according to one embodiment.

In the drawings, like reference numerals refer to like elements throughout, and the various features are not necessarily drawn to scale. Also, the term "couple" or "couples" includes indirect or direct electrical or mechanical connection or combinations thereof. For example, if a first device couples to or is coupled with a second device, that connection may be through a direct electrical connection, or through an indirect electrical connection via one or more intervening devices and connections. One or more operational characteristics of various circuits, systems and/or components are hereinafter described in the context of functions which in some cases result from configuration and/or interconnection of various structures when circuitry is powered and operating.

Described examples include charging systems and charging controllers that provide a solution in which multiple ports are available for intelligent charging of connected sink devices using a single converter with a DC power output, and the controller sets the DC voltage of the converter according to a highest common compatible voltage of device parameters of the connected sink device parameters, and according to a power budget of the converter. Example solutions can be useful in USB-PD or other charger applications to leverage the functionality of a single output DC to DC, while reducing the size, cost and complexity of multi-port charges that have two or more converters. Moreover, the described solutions facilitate economical choice of converter size and power budget according to expected usage, while accommodating charging when most or all ports are being used.

FIG. 1 shows a multi-port charging system 100 (e.g., labeled CHARGER in FIG. 1) for charging one or more battery operated devices. In one example, the charging system 100 is a stand-alone product, such as a portable battery-operated charger for charging one or more USB compatible devices (e.g., referred to as sink devices). In another example, the charging system 100 is integrated into a host device, such as a laptop or desktop computer, an automotive vehicle, an industrial system (not shown).

The charging system 100 includes a single converter 101 having a power input 102 adapted to be coupled to a supply 103. In one example, the converter 101 is an AC to DC converter having a single or multiphase AC input 102 coupled to receive an AC input voltage signal VIN from an AC supply 103. In another example, the converter 101 is a DC to DC converter having a DC input to receive to receive a DC input voltage signal VIN from the supply 103. In one implementation, the charging system is a portable multi-port USB charger and the supply 103 is a battery or other DC voltage supply with features for charging the on-board battery from an AC source (not shown). In another example, the charging system 100 is an automotive accessory with multiple USB charging ports accessible from a passenger compartment, and the supply 103 is a 12 V battery. In another example, the charging system 100 is part of an industrial system, and the supply 103 is a 24 V DC source. In one example, the charging system 100 operates from a variety of connectable DC supplies 103, with output voltages that vary widely (e.g., 3-30 V) and the converter 101 has a wide input voltage range to accommodate coupling the power input 102 to different supplies 103 with different DC output voltages.

The converter 101 also includes a power output 104 that provides a DC output voltage signal VO. The converter 101 further includes a control input 105 configured to receive a voltage select signal VSEL. In one example, the control input 105 is adapted to receive an analog voltage or current signal VSEL. In another example, the control input 105 is adapted to receive a single or multi-bit digital signal VSEL. The received voltage select signal VSEL in one example has an integer number of M states, where M is greater than 1. The converter 101 responds to the state of the voltage select signal VSEL to set the voltage VO of the power output 104. In one example, the converter 101 is configured to provide selectable DC output voltages VO of 0, 5, 9, 12, 15, and 20 V according to the state of the received voltage select signal VSEL (e.g., M=6).

The example charging system 100 includes a transformer or inductor circuit 106 coupled to the power output 104 of the converter 101, as well as a filter circuit 107 coupled to an output of the inductor or transformer circuit 106. In other examples, one or both of the inductor or transformer circuit 106 and the filter circuit 107 can be omitted.

The charging system 100 includes a controller 108. In one example, the controller 108 is an integrated circuit (IC). The controller 108 includes a power input terminal 109. The power input terminal 109 is adapted to be coupled to a power output 104 of a converter 101 to receive a DC voltage signal PPHV. In one example, the charging system 100 is or includes a printed circuit board, and the controller 108 includes a conductive IC terminal (e.g., pin, pad, etc.) soldered to a conductive pad of the printed circuit board. In one implementation, the converter 101 is also an integrated circuit with output terminals 104 soldered to the circuit board to form an electrical connection, direct or indirect, to the power input terminal 109 of the controller 108. The power input terminal 109, in this regard, can be directly or indirectly coupled to the converter power output 104, with one or more intervening devices or circuits (e.g., inductor or transformer circuit 106, filter circuit 107) connected therebetween.

The controller 108 also includes an integer number of N power output terminals 110, where N is greater than 1. The respective power output terminals 110 are coupled, directly or indirectly to the power input terminal 109. The controller 108 has a ground or reference voltage connection terminal 111 coupled to the negative DC output of the converter 101, directly or through the circuits 106 and 107. The controller 108 also includes a communications input terminal 112 and a control output terminal 113. The control output terminal 113 is adapted to be coupled to the control input 105 of the converter 101, for example, by circuit board connections of a printed circuit board. The control output terminal 113 has M states.

The controller 108 also includes a logic circuit 114 with a communications interface coupled to the communications input terminal 112, and a voltage select output coupled to the control output terminal 113. In one example, logic circuit 114 includes a processor (e.g., a microprocessor, microcontroller, FPGA, programmable circuit, etc.) coupled to a memory 115. The memory 115 in one example stores processor-executable program instructions to implement the various charging functions and features detailed herein as well as other functions associated with operating the converter 101, selectively coupling connected sink devices to the power input terminal 109, communicating with connected sink devices, etc. In addition, the logic circuit 114 in one example communicates with other external devices, such as a host processor (not shown). The charging system 100 in certain examples includes user interface features, such as a user interface with a display and keyboard or touchscreen features to provide indications to users and to receive user inputs (not shown). In addition, the memory 115 stores parameters associated with charging capabilities of connected sink devices, as well as a power budget associated with the converter 101. In another example, the logic circuit 114 includes a state machine. The logic circuit 114 communicates with connected sink devices via the communications input terminal 112.

In one example, the controller 108 includes a switch circuit 116 having an integer number of N switches S1, S2, . . . , SN, where N is greater than 1. The respective switches S1, S2, . . . , SN include a first terminal coupled to the power input terminal 109, a second terminal coupled to a respective one of the power output terminals 110, and a control terminal. The switches in one example are transistors, such as bipolar transistors, field effect transistors (FETs). In other examples, the switches are relays, such as solid-state relays, etc. In this example, the logic circuit 114 includes N switch control outputs 117 coupled to the control terminals of respective ones of the switches S1, S2, . . . , SN. The logic circuit 114 generates switching control signals SC at the switch control outputs 117 to selectively couple the power input terminal 109 to selected ones of the power output terminals 110.

The charging system 100 includes N charger ports. Only three charger ports 120, 130, and 140 are illustrated in FIG. 1. The charger ports 120, 130, and 140 include respective charging power lines 122, 132, and 142 coupled to a respective one of the power output terminals 110. In one example, the ports 120, 130, and 140 are USB ports with USB compatible connectors that include corresponding charging power lines 122, 132, and 142 to convey respective bus voltage signals VBUS1, VBUS2, and VBUSN from the corresponding power output terminals 110 of the controller to charge a connected sink device. In addition, the charger ports 120, 130, and 140 include respective communications lines 124, 134, and 144 coupled to the communications input terminal 112. FIG. 1 shows one example, in which a first sink device 126 (e.g., smart phone) is connected via a USB cable 128 to the first port 120, a second sink device 136 is connected via a USB cable 138 to the second port 130, and a another sink device 146 is connected via a cable 148 to the $N^{th}$ port 140. The USB connectors in one example also include a corresponding ground pin (labeled GND in FIG. 1), which are connected to the reference voltage connection terminal 111. In addition, the example USB connectors of the charging ports 120, 130, and 140 are Type-C plugs that include two configuration channel lines CC1 and CC2, one or both of which are connected to the respective communications lines 124, 134, and 144 (labeled CC in FIG. 1). In one example, the logic circuit 114 includes N communications input terminals 112 as shown in FIG. 1. In another implementation, the communications lines 124, 134, and 144 are connected in a single communications line 112, which is coupled to a communications interface of the logic circuit 114.

In one example, the logic circuit 114 communicates with connected sink devices 126, 136, and 146 as these are coupled to respective ones of the charger ports 120, 130, and 140. The connected sink devices 126, 136, and 146 report their corresponding sink device parameters 121, 131, and 141, which are received by the logic circuit 114 in communications signals of the communications input terminal 112. The logic circuit 114 in one example stores the sink device parameters 121, 131, and 141 in the memory 115. The memory 115 in one example stores a power budget 150 of the converter 101 that is coupled to the power input terminal 109. In operation, the logic circuit 114 controls the state of the control output terminal 113 responsive to a highest common compatible voltage of one or more sink devices 126, 136, 146 coupled to one or more respective ones of the power output terminals 110. The sink device parameters 121, 131, and 141 specify one or more compatible charging voltages and corresponding compatible current levels at which the corresponding sink devices 126, 136, and 146 can be charged.

In the example of FIG. 1, the first sink device 126 has parameters 121 stored in the memory 115 that inform the logic circuit 114 that the sink device 126 can be charged at a first voltage V1 and corresponding first current I1, as well as at a second voltage/current pair V2/I2, etc. The parameters 121 indicate an integer number "i" voltage current pairs including a final $i^{th}$ pair Vi, Ii) for the sink device 126 coupled to the first charger port 120. The second connected sink device 136 has parameters 131 stored in the memory 115, including an integer number "j" voltage/current value pairs V1/I1, V2/I2, . . . , Vj/Ij. The final connected sink device 146 has parameters 141 stored in the memory 115, including an integer number "k" voltage/current value pairs V1/I1, V2/I2, . . . , Vk/Ik. The power budget 150 in one example stores M selectable DC output voltage values for the voltage VO of the power output 104 of the converter 101. In one example, with M=6, the power budget 150 stores values corresponding to selectable DC output voltage values VO=0, 5, 9, 12, 15, and 20 V, as well as corresponding current values or corresponding power values from which the logic circuit 114 determines a maximum charging current available for the M selectable voltages.

In operation, the logic circuit 114 controls the state of the control output terminal 113 to set the DC output voltage VO of the power output 104 according to a selected highest common compatible voltage of one or more sink devices 126, 136, and 146 coupled to one or more respective ones of the charger ports 120, 130, and 140. The converter 101 operates at a selected DC output voltage according to the state of the received voltage select signal VSEL. In one example, the logic circuit 114 selects the highest common compatible voltage of the one or more sink devices 126, 136, 146 responsive to the sink device parameters 121, 131, and 141 received in communications signals of the communications input terminal 112, and the power budget 150 of a converter 101. The logic circuit 114 controls the state of the control output terminal 113 by generating the voltage select signal VSEL having a state that represents the selected highest common compatible voltage of the sink device parameters 121, 131, and 141. In one example, the logic circuit 114 selects an updated highest common compatible voltage of the sink device parameters 121, 131, and 141 according to the power budget 150 in response to connection of one or more sink devices to one or more respective ones of the power output terminals 110, or disconnection of one or more sink devices from one or more respective ones of the power output terminals 110. In this manner, the logic circuit adapts the operation to provide a best charging condition for the currently coupled sink devices.

Figure 2:
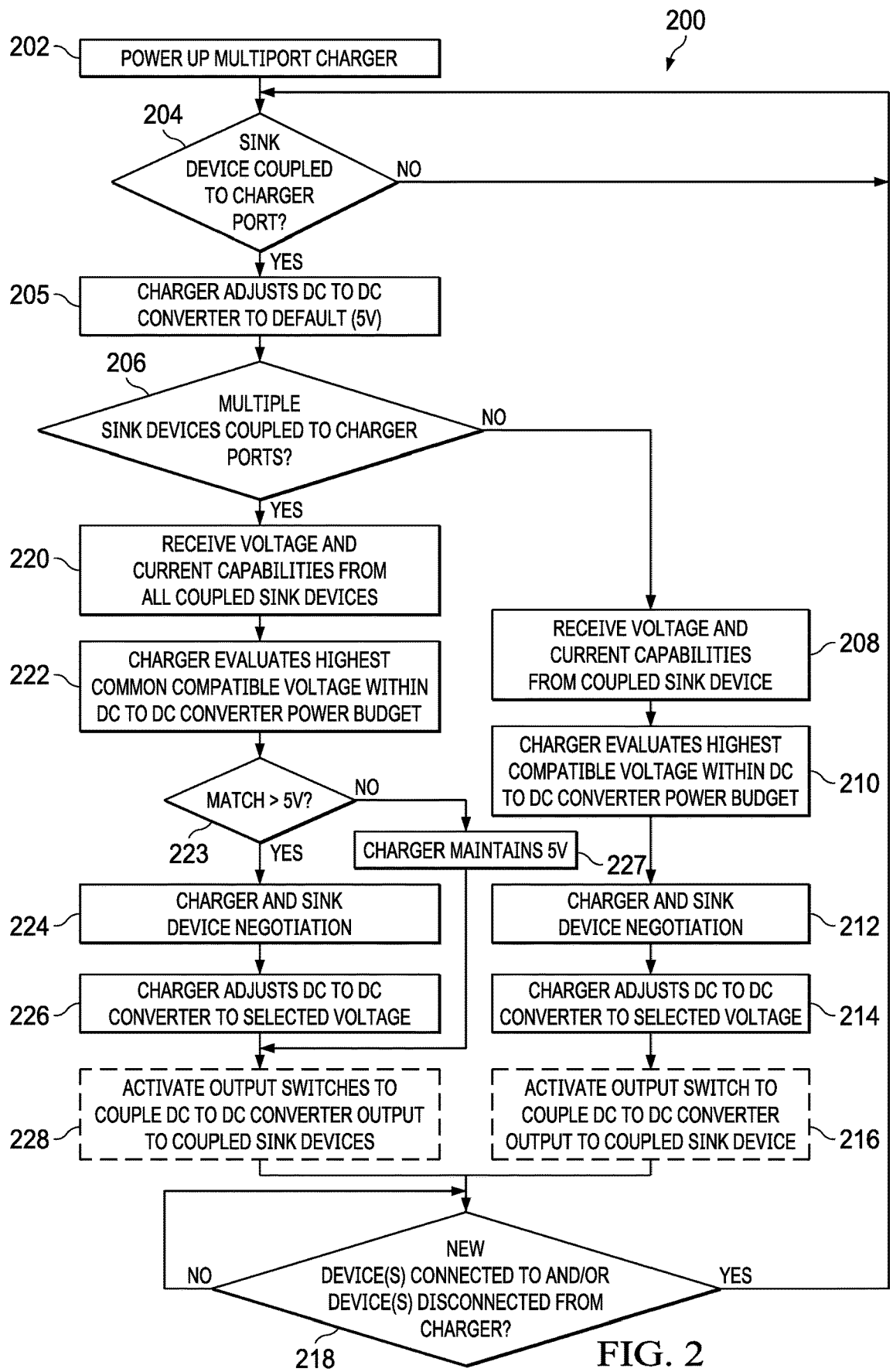
FIG. 2 is a flow diagram of a method to charge one or more sink devices using a single converter according to another embodiment.
Figure 3:
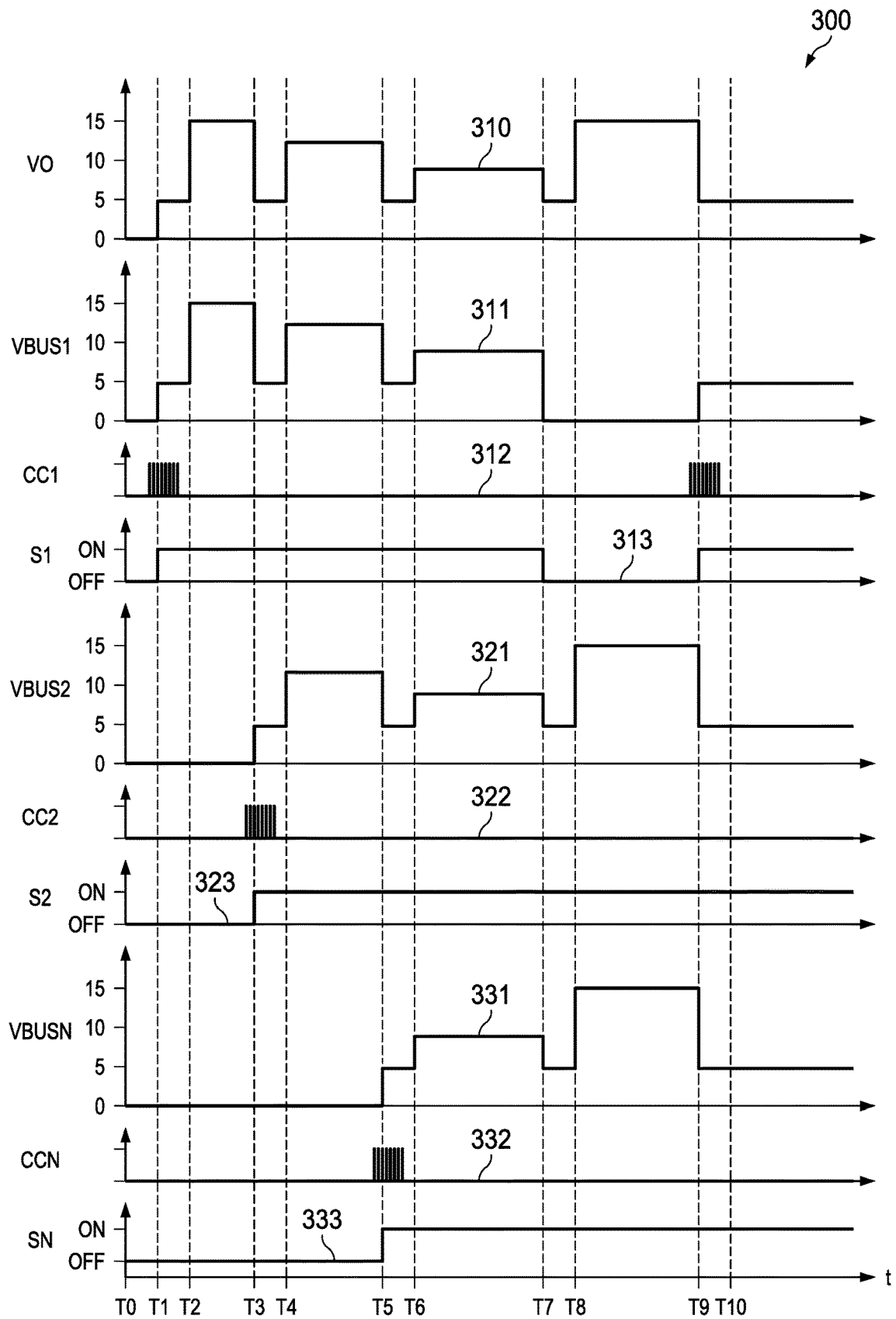
FIG. 3 is a signal diagram of example signals in the charging system of FIG. 1.

Referring also to FIGS. 2 and 3, FIG. 2 shows a method 200 for charging one or more sink devices 126, 136, 146 using a single converter 101, and FIG. 3 shows a signal diagram of example signals in the charging system of FIG. 1 during operation of the logic circuit 114 according to the method 200. In one implementation, the logic circuit 114 executes program instructions from the memory 115 in order to perform the acts or events of the method 200. In another implementation, the logic circuit 114 includes a state machine that implements the method 200. The method 200 as described hereinafter in association with the charging system 100 of FIG. 1. The method 200 begins at 202 with power up of the multiport charging system 100. In one example, the logic circuit 114 monitors the communications input terminal 112 for communications signals from any connected sink device. The logic circuit 114 determines at 204 whether one or more sink devices are coupled to the charger ports. If not (NO at 204), the logic circuit 114 continues to monitor the communications input terminal 112 for communications signals indicating coupling of one or more sink devices.

Once one or more sink devices are coupled to respective ones of the charger ports (YES at 204), the logic circuit 114 adjusts the converter output voltage VO to a default value (e.g., 5 V) at 205, and the logic circuit 114 determines at 206 whether multiple sink devices are coupled to respective charger ports. If only a single sink device is coupled (NO at 206), the logic circuit 114 receives voltage and current capabilities from the connected sink device at 208, and stores the received sink device parameters (e.g., 121) in the memory 115. At 210, the logic circuit 114 of the charging system 100 selects (e.g., evaluates) the highest compatible voltage within the converter power budget 115. Where only a single sink device is connected, the logic circuit 114 in one example selects the highest compatible voltage from the corresponding connected sink device parameters 121, and determines whether the corresponding voltage is possible according to the list of M selectable DC output voltages of the power budget 150. If not, the logic circuit 114 evaluates the next highest voltage, and determines whether that voltage is possible using the converter 101. Once the logic circuit 114 determines an available charging voltage of the sink device parameters 121, the logic circuit 114 determines whether the associated charging current of the sink device parameters 121 is within the power budget 150. If so, the logic circuit 114 selects this as the highest compatible voltage within the converter our budget 150 at 210.

At 212, logic circuit 114 negotiates with the connected sink device to cause the connected sink device to operate at the selected charging voltage, for example, using communications via the communications input terminal 112. At 214, the logic circuit 114 adjusts the converter 101 to the selected voltage. In one example, the logic circuit 114 controls the state of the control output terminal 113 by generating the voltage select signal VSEL having a state that represents the selected highest common compatible voltage at 214 in order to adjust the output voltage VO at the power output 104 of the converter 101. In one example, at 216 in FIG. 2, the logic circuit 114 generates an associated one of the switching control signals SC at the switch control output 117 to selectively couple the power input terminal 109 to a selected one of the power output terminals 110 to which the sink device (e.g., 126) is coupled.

The method 200 in this example continues at 218, where the logic circuit 114 monitors the communications input terminal 112 for communications signals indicating coupling of one or more sink devices to other charger ports, and/or for loss of communications signaling indicating that the currently coupled sink device has been disconnected from the associated charger port. In response to new connection and/or disconnection (YES at 218), the method 200 returns to 204 and 206 as described above, where the logic circuit 114 determines whether any sink devices are coupled to the charging system 100 (YES at 204), and whether more than one sink devices are coupled to the charging system 100 (YES at 206).

In response to detection of more than one sink devices being coupled to the charging system 100 (YES at 206), the logic circuit 114 receives voltage and current capabilities (e.g., sink device parameters) from all currently coupled sink devices at 220, and selects (e.g., evaluates) a highest common compatible voltage within the converter power budget 150 at 222. In one example, the logic circuit 114 determines the highest voltage at 222 that is selectable for operation by the converter 101, and that is common to all the stored sink device parameters (e.g., 121, 131, and 141 in the case where three sink devices 126, 136, and 146 are coupled as shown in FIG. 1). In addition, the logic circuit 114 determines at 222 whether the sum of the associated charging current from the sink device parameters at that DC output voltage are within the power budget 150 of the converter 101. If not, the logic circuit 114 likewise evaluates the next lowest voltage that is selectable for operation of the converter 101 and that is common to all the sink device parameters for currently coupled sink devices.

In one example, the converter 101 is selected such that its power budget 150 allows charging of all coupled sink devices (e.g., 126, 136, . . . , 146) when all the charger ports 120, 130, . . . , 140 are in use, for example, at the default USB charging voltage of 5 V at 0.5 A. In another example, a smaller converter 101 is used, and the logic circuit 114 selectively implements a priority algorithm to selectively charge less than all coupled sink devices when all the charger ports are used. In one implementation, the logic circuit 114 implements a first in, first out priority algorithm, for example, where one or more most recently connected sink devices is/are temporarily denied charging service (e.g., by the logic circuit 114 opening the associated switch of the switch circuit 116) while the earliest connected devices are charged.

At 223, the logic circuit 114 determines whether there is a match that exceeds 5 V. If so (YES at 223), the process 200 proceeds to 224. At 224 in FIG. 2, the logic circuit 114 negotiates with the connected sink device to cause the connected sink devices to operate as the selected highest common compatible charging voltage using communications via the communications input terminal 112. At 226, the logic circuit 114 adjusts the converter 101 to the selected voltage by generating the voltage select signal VSEL having a state that represents the selected highest common compatible voltage to cause the converter 101 to adjust the output voltage VO at the power output 104. If there is no match that exceeds 5 V (e.g., NO at 223), the charger maintains the default 5 V output voltage VO at the power output 104. In one example, the logic circuit 114 generates associated ones of the switching control signals SC at the switch control output 117 at 228 to selectively couple the power input terminal 109 to a selected one of the power output terminals 110 to which the sink device (e.g., 126) is coupled. Thereafter, the multi-port charging continues at 218, and the logic circuit 114 monitors the communications input terminal 112 for communications signals indicating coupling of one or more sink devices to other charger ports, and/or for loss of communications signaling indicating disconnection of one or more currently coupled sink devices from the associated charger ports.

In one implementation, the logic circuit 114 generates the voltage select signal VSEL to cause the converter 101 to output a predetermined voltage (e.g., 5 V) during negotiation and evaluation to select and implement the highest common compatible voltage, and the logic circuit 115 activates the associated switch is of the switch circuit 116 by generating the corresponding switching control signals SC at the switch control output 117 to couple the respective charging power lines (e.g., 122, 132, and/or 142) and the corresponding power output terminals 110 to the power input terminal 109 during the negotiation and evaluation operations.

In another implementation, the logic circuit 114 generates the switching control signals SC to disconnect all the respective charging power lines and the power output terminals 110 from the power input terminal 109 during negotiation and adjustment of the converter 101 according to the voltage select signal VSEL, and changes the switching control signals SC to selectively couple selected ones of the power output terminals 110 to the power input terminal 109 once the selected charging voltage has been established by the converter 101.

FIG. 3 shows a signal diagram 300 with example curves 310-313, 321-323, and 331-333 that show example signals in the charging system 100 as a function of time during operation of the logic circuit 114 according to the method 200. The curved 310 shows the DC output voltage VO at the power output 104 of the converter 101, and the curve 311 shows the bus voltage signal VBUS1 at the charging power line 122 of the charger port 120. The curve 312 shows communications signals (CC1) of the communications line 124 of the first charger port 120, and the curve 313 shows the state (e.g., ON or OFF) of the first switch S1. The signal diagram 300 also includes curves 321-323 corresponding to the second charger port 130, including the curve 321 that shows the second bus voltage signal VBUS2 at the charging power line 132, the curve 322 that shows communications signals (CC2) of the second communications line 134, and the curve 323 that shows the on/off state of the second switch S2. The curves 331-333 correspond to the final charger port 140, where the curve 331 shows the bus voltage signal VBUSN at the charging power line 142, the curve 332 shows communications signals (CC3) of the communications line 144, and the curve 333 shows the on/off state of the switch SN.

In the example of FIG. 3, no sink devices are coupled to the charging system 100 at time T0, and the first sink device 126 is coupled via the cable 128 to the first charger port 120 at a time prior to T1. The logic circuit 114 generates the voltage select signal VSEL from T0 through T1 to cause the converter 101 to output 0 V from T0 through T1. The logic circuit 114 receives communications from the first sink device 126 (curve 312) prior to T1. The logic circuit 114 responds by setting the converter voltage (curve 310) to 5 V at time T1. In this example, the logic circuit 114 also closes the first switch S1 (curve 313) at time T1, and the connected sink device 126 begins charging at the default voltage value of 5 V. From T1 to time T2 in this example, the logic circuit 114 receives the sink device parameters 121 from the sink device 126, evaluates the parameters 121 to determine the highest compatible voltage for charging the sink device 126, referred to as negotiation operation (e.g., 208-216 in FIG. 2). In the illustrated example, the first sink device 126 is capable of charging at 15 V, and the logic circuit 114 determines that this is an available voltage within the capabilities of the converter 101. At time T2, the logic circuit 114 generates the voltage select signal VSEL with a state that causes the converter 101 to output 15 V (curve 310), and the switch circuit 116 couples this charging voltage to the charging power line 122 of the charger port 120 (VBUS1, curve 311). The device 126 charges at 15 V from T2 to T3.

After T2 and before T3, the second sink device 136 is coupled via the cable 138 to the second charger port 130, and the logic circuit 114 receives communications from the sink device 136 (curve 322) prior to T3. The logic circuit 114 responds by resetting the converter voltage (curve 310) to the default 5 V value at time T3, and the logic circuit 114 closes the second switch S2 (curve 323) at time T3 such that the newly connected sink device 136 and the previously coupled sink device 126 charge at the default voltage value of 5 V. Between times T3 to T4, the logic circuit 114 receives the sink device parameters 131 from the newly connected sink device 126, and evaluates the parameters 121 and 131 to determine the highest common compatible voltage for charging the sink devices 126 and 136 (e.g., negotiation operation at 220-228 in FIG. 2). In this example, the second sink device 136 is not capable of 15 V charging, but both devices 126 and 136 can be charged at 12 V, with charging current requirements within the power budget 150 of the converter 101. By evaluating the sink device parameters 121 and 131, along with the power budget 150, the logic circuit 114 selects the highest common compatible voltage of 12 V (222 in FIG. 2). At T4, the logic circuit 114 negotiates with the connected sink device to cause the coupled devices 126 and 136 to this selected voltage (224 in FIG. 2), and generates the voltage select signal VSEL (226) with a state that causes the converter 101 to output 12 V (curve 310). In this configuration, the sink devices 126 and 136 charged at 12 V from T4 to T5 in FIG. 3.

The example continues with the logic circuit 114 receiving communications prior to T5 from a newly coupled sink device 146, which has been coupled via the cable 148 to the charger port 140 in FIG. 1. At time T5, the logic circuit 114 generates the voltage select signal VSEL to reset the converter voltage (curve 310) to the default 5 V value, and closes the switch SN (curve 333) such that the sink devices 126, 136, and 146 charge at the default voltage value of 5 V from T5 to T6. Between T5 and T6, the logic circuit 114 receives the sink device parameters 141 from the newly connected sink device 146, and evaluates the parameters 121, 131, and 141 to determine the highest common compatible voltage for concurrently charging the three coupled sink devices 126, 136, and 146 (e.g., negotiation operation at 220-228 in FIG. 2). In this example, the sink device 146, although capable of charging at 12 V, would add excessive charging current requirements that would exceed the power budget 150 of the converter 101. However, the sink device parameters 121, 131, and 141 indicate that the coupled sink devices 126, 136, and 146 can each accommodate charging at 9 V within the power budget 150 of the converter 101.

The logic circuit 114 selects this voltage as the highest common compatible voltage (e.g., 222 in FIG. 2). At T6, the logic circuit 114 negotiates with the connected sink devices to cause the coupled devices 126, 136, and 146 to the 9 V selected voltage (224 in FIG. 2), and generates the voltage select signal VSEL (226) with a state that causes the converter 101 to output 9 V (curve 310). In this configuration, the sink devices 126, 136, and 146 are charged at 9 V from T6 to T7 in FIG. 3.

At T7 in FIG. 3, the logic circuit 114 detects that the first sink device 126 has been disconnected (e.g., decoupled) from the first charger port 120 (e.g., YES at 218 in FIG. 2). In response, the logic circuit 114 turns the first switch S1 off (curve 313) at T7, and resets the converter voltage VO to the default value of 5 V. Between T7 and time T8, the logic circuit 114 reevaluates the charger voltage in view of the sink device parameters 131 and 141 of the respective remaining sink devices 136 and 146. In this example, both the remaining sink devices 136 and 146 can operate at a charger voltage of 15 V within the power budget 150 of the converter 101, and the logic circuit 114 selects 15 V as the highest common compatible voltage (222 in FIG. 2). The logic circuit negotiates with the connected sink devices to cause the connected devices 136 and 146 to charge at this voltage (224), and generates the voltage select signal VSEL (226) to adjust the DC output voltage VO of the converter 101 to 15 V at T8. The coupled sink devices 136 and 146 charge at 15 V from T8 to T9.

Prior to time T9, the logic circuit 114 in this example receives communications (curve 312) from another sink device (not shown in FIG. 1) that has been coupled to the first charger port 120 between T8 and T9. At T8, the logic circuit 114 generates the voltage select signal VSEL to reset the converter voltage (curve 310) to the default 5 V value, and closes the switch S1 (curve 313) such that the three coupled sink devices charge at 5 V from T9 to T10. Between T9 and T10, the logic circuit 114 receives the sink device parameters from the newly connected sink device coupled to charger port 120, and evaluates the sink device parameters of all three coupled sink devices in order to determine the highest common compatible voltage (e.g., negotiation operation at 220-228 in FIG. 2). In this example, the newly coupled sink device is not capable of fast charging, and can only charge at 5 V. The logic circuit 114 accordingly selects 5 V (222 in FIG. 2) is the highest common compatible voltage. At T10, the logic circuit 114 negotiates with the connected sink devices to cause the coupled devices to the 5 V selected voltage (224 in FIG. 2), and generates the voltage select signal VSEL (226) with a state that causes the converter 101 to output 5 V (curve 310). In this configuration, the sink devices continue charging at 5 V after T10 in FIG. 3.

Figure 4:
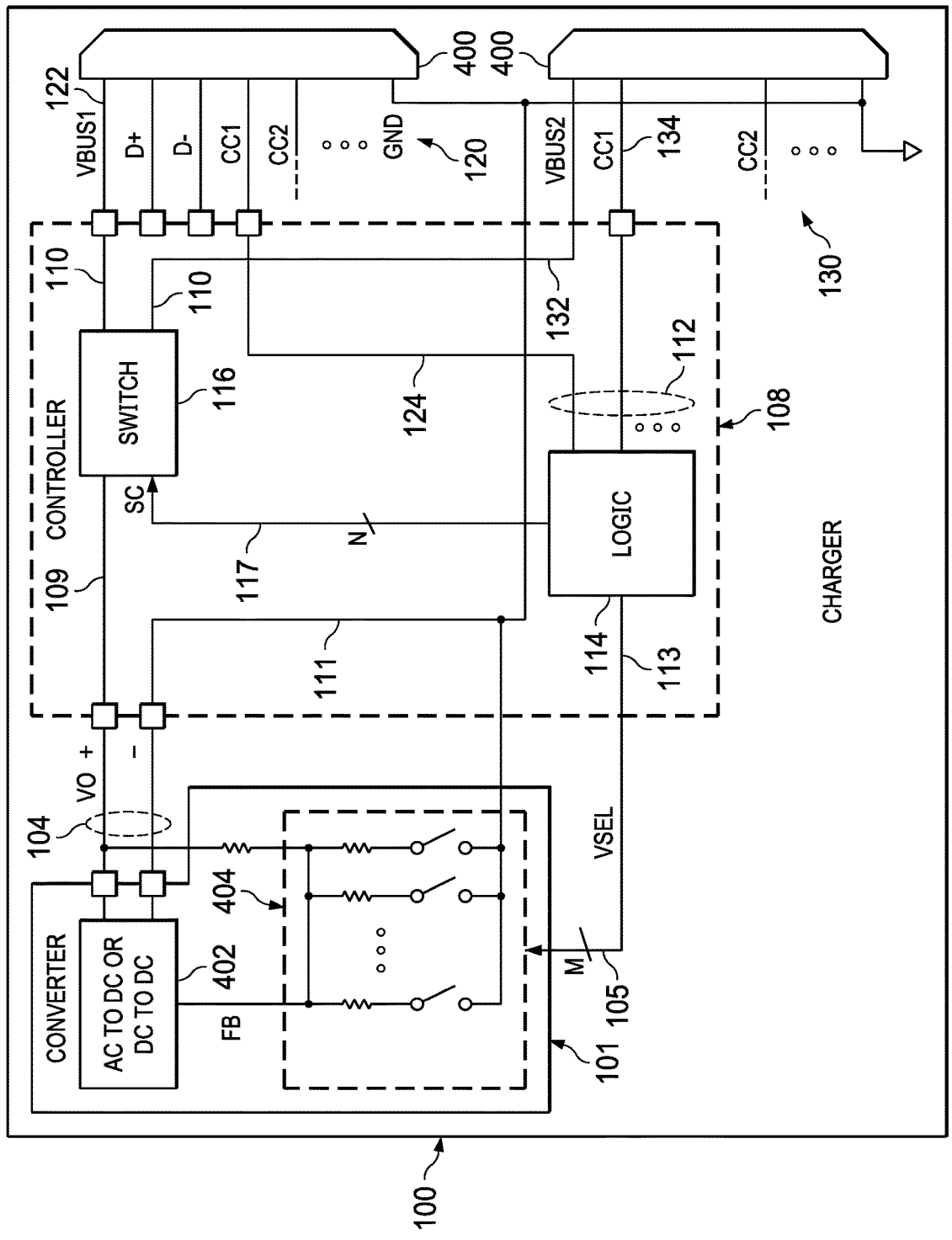
FIG. 4 is a schematic diagram of a multi-port USB-PD charger with a single adjustable converter according to another embodiment.

FIG. 4 shows a multi-port USB-PD implementation of the charging system 100 with a single adjustable converter 101 according to another embodiment. In this example, the charging system 100 includes USB Type C socket connectors 100 that individually have bus voltage (VBUS) terminals, positive and negative data terminals D+ and D−, configuration channel lines CC1 and CC2, and a ground terminal (GND). The converter 101 in this example includes a switching converter circuit 402 that converts AC input power to DC output power, or converts DC input power to DC output power, including the power output terminals 104 as described above. The converter 101 includes a feedback circuit 404 that provides a feedback voltage signal FB to the switching converter circuit 402. In operation, the switching converter circuit 402 regulates the DC output voltage VO at the power output 104 by comparing the feedback voltage signal FB to an internal reference signal (not shown). The feedback circuit 404 includes a resistive voltage divider circuit formed by an upper feedback resistor and an integer number M lower feedback resistors. The lower feedback resistors in this example are coupled between the upper feedback resistor and the reference voltage connection terminal 111 coupled to the negative DC output of the converter 101, including switches between the lower feedback resistors and the reference voltage connection terminal 111. In operation, the logic circuit 114 provides a multi-bit digital voltage select signal VSEL having M control signals to operate individual switches of the feedback circuit 404. The lower feedback resistors have different values corresponding to feedback voltage signal amplitudes that drive the regulated DC output voltage VO to the designated M values for controlled selection by the logic circuit 114.

The described examples can be applied to portable and integrated USB chargers for home use or integration into automotive or industrial systems, as well as in other charging applications to charge multiple sink devices using a single adjustable AC to DC or DC to DC converter. The described controller sets the DC output voltage of the converter according to the highest common compatible voltage of device parameters of the connected sink device parameters, and according to a power budget of the converter. Example solutions can be useful in USB-PD or other charger applications to leverage the functionality of a single output DC to DC, while reducing the size, cost and complexity of multi-port charges that have two or more converters. In a dual port USB-PD implementation example with a DC to DC converter 101 capable of 3-21 V at 0-6 A, a first sink device connects to Port A and reports its sink capabilities (e.g., 5 V at 3 A; 9 V at 2.3 A; and 20 V at 1 A). The logic circuit 115 and the sink device negotiate a power delivery contract of 20 V at 1 A. Thereafter, a second sink device connects to Port B. The logic circuit 114 communicates using the USB Power Delivery protocol and negotiates with the connected sink device to cause the sink device attached to Port A to 5 V at 3 A. The logic circuit 114 then establishes a connection with the Port B sink device at 5 V at 3 A, and requests the sink device parameters from the sink device coupled to Port B. The second sink device reports capabilities of 5 V at 1.5 A; 9 V at 1.8 A; and 15 V at 1.2 A. The 9 V option is available for both devices. The logic circuit 114 then negotiates ports A and B to 9 V, resulting in the first sink device of Port A establishing a 9 V at 2 A contract and the second device of Port B establishing a 9 V at 1 A contract. Both sink devices are charged from the common DC to DC converter 101 that operates with a DC output voltage VO of 9 V and the total current for port A and port B is below the maximum rating of the source (e.g., 2.3 A+1.8 A=4.1 A<6 A capability of the power budget 150). In certain examples, the logic circuit 114 operates within the boundaries of the USB-PD specifications to interrogate multiple USB sink connections and map a voltage and current profile common to all connected sink devices. In accordance with the USB-PD specifications, all sink devices are presumed to be operable for charging at the default value of 5 V. Described examples of the controllers 108 and systems 100 use the USB-PD controller 108 to use a single DC to DC or other converter 101 and establish contracts with all connected USB sink devices without exceeding either the individual capabilities of each sink device or the total power available from the DC to DC converter 101.

Modifications are possible in the described examples, and other implementations are possible, within the scope of the claims.

What is claimed is:

1. A controller, comprising:
   N power output terminals, wherein N is an integer greater than 1, and each respective power output terminal is coupled to a respective charger port;
   a switch circuit having N switches, wherein each respective switch has a first terminal, a second terminal, and a control terminal, and the respective first terminals are each coupled to a power input terminal, the respective second terminals are each coupled to a respective power output terminal, and each power output terminal provides a different voltage;
   a communications input terminal coupled to the respective charger ports; and
   a control output terminal coupled to a control input, wherein the control output terminal has M states, where M is an integer greater than 1.

2. The controller of claim 1, further comprising a logic circuit having a communications interface coupled to the communications input terminal, and a voltage select output coupled to the control output terminal.

3. The controller of claim 2, wherein the logic circuit further includes N switch control outputs, wherein each switch control output is coupled to a control terminal of a respective switch.

4. The controller of claim 2, wherein the logic circuit is configured to control a state of the control output terminal responsive to a highest common compatible voltage of one or more sink devices coupled to one or more respective power output terminals.

5. The controller of claim 4, wherein the logic circuit is configured to select the highest common compatible voltage of the one or more sink devices responsive to: sink device parameters received in communications signals of the communications input terminal; and a power budget of a converter coupled to the power input terminal.

6. The controller of claim 1, wherein the controller is configured to control a state of the control output terminal responsive to a highest common compatible voltage of one or more sink devices coupled to one or more of the respective power output terminals.

7. The controller of claim 6, wherein the controller is configured to select the highest common compatible voltage of the one or more sink devices responsive to: sink device parameters received in communications signals of the communications input terminal; and a power budget of a converter coupled to the power input terminal.

8. The controller of claim 1, wherein the controller is an integrated circuit.

9. A controller, comprising:
   a power input terminal;
   N power output terminals, in which N is an integer greater than 1, and each of the respective power output terminals provides a different voltage;
   a communications input terminal;
   a control output terminal having M states, in which M is an integer greater than 1; and
   a logic circuit configured to:
      receive communications signals of the communications input terminal, wherein the communications signals have sink device parameters of one or more sink devices coupled to one or more respective ones of the power output terminals;
      select a highest common compatible voltage of the sink device parameters according to a power budget of a converter coupled to the power input terminal; and
      control a state of the control output terminal responsive to the selected highest common compatible voltage of the sink device parameters to cause the converter to deliver the selected highest common compatible voltage at the power input terminal.

10. The controller of claim 9, wherein the logic circuit is configured to control the state of the control output terminal by providing a voltage select signal at the control output terminal, in which a state of the voltage select signal represents the selected highest common compatible voltage of the sink device parameters.

11. The controller of claim 10, wherein the logic circuit is configured to provide the voltage select signal as a digital signal having a selected one of M states.

12. The controller of claim 9, wherein the logic circuit includes a processor coupled to a memory, in which the memory is configured to store the sink device parameters and the power budget.

13. The controller of claim 9, wherein the logic circuit includes a state machine.

14. The controller of claim 9, wherein the logic circuit is configured to select an updated highest common compatible voltage of the sink device parameters according to the power budget responsive to:
   connection of one or more sink devices to one or more respective power output terminals; or
   disconnection of one or more sink devices from one or more of the respective power output terminals.

15. The controller of claim 9, further comprising a switch circuit having N switches, wherein:
   each switch has a respective first terminal, a respective second terminal, and a respective control terminal, in which the respective first terminals are each coupled to the power input terminal, and the respective second terminals are each coupled to a respective power output terminal;

the logic circuit includes N switch control outputs coupled to the respective control terminal of a respective switch; and the logic circuit is configured to provide switching control signals at the respective control terminals to selectively couple the power input terminal to selected power output terminals to which a sink device is connected.

16. A charging system, comprising:

a converter having a power output, and a control input;

a controller having a power input terminal, N power output terminals, a communications input terminal, and a control output terminal, N being an integer greater than 1, wherein the power input terminal is coupled to the power output of the converter, each respective power output terminal providing a different voltage, the control output terminal is coupled to a converter, and the control output terminal having M states, M being an integer greater than 1;

N charger ports, each of the respective charger ports having a charging power line coupled to a respective power output terminal, and a communications line coupled to the communications input terminal; and the controller being configured to control a state of the control output terminal to set a voltage of the power output according to a selected highest common compatible voltage of one or more sink devices coupled to one or more respective charger ports.

17. The charging system of claim 16, wherein the controller is configured to:

receive communications signals of the communications input terminal, wherein the communications signals have sink device parameters of the one or more sink devices;

select the highest common compatible voltage of the sink device parameters according to a power budget of the converter; and provide a voltage select signal at the control output terminal, wherein a state of the voltage select signal represents the selected highest common compatible voltage of the sink device parameters.

18. The charging system of claim 16, further comprising a switch circuit having N switches, each respective switch having a first terminal, a second terminal, and a control terminal, wherein the respective first terminals are each coupled to the power input terminal, and the respective second terminals are each coupled to a respective power output terminal;

wherein the controller includes N switch control outputs, each switch control output coupled to the control terminals of a respective switch; and wherein the controller is configured to provide switching control signals at the switch control outputs to selectively couple the power input terminal to selected power output terminals to which a sink device is connected.

* * * * *